May 18, 1965  C. R. BYRD ETAL  3,183,599
APPARATUS FOR TESTING A PLURALITY OF ASSOCIATED DEVICES
Filed Dec. 31, 1962
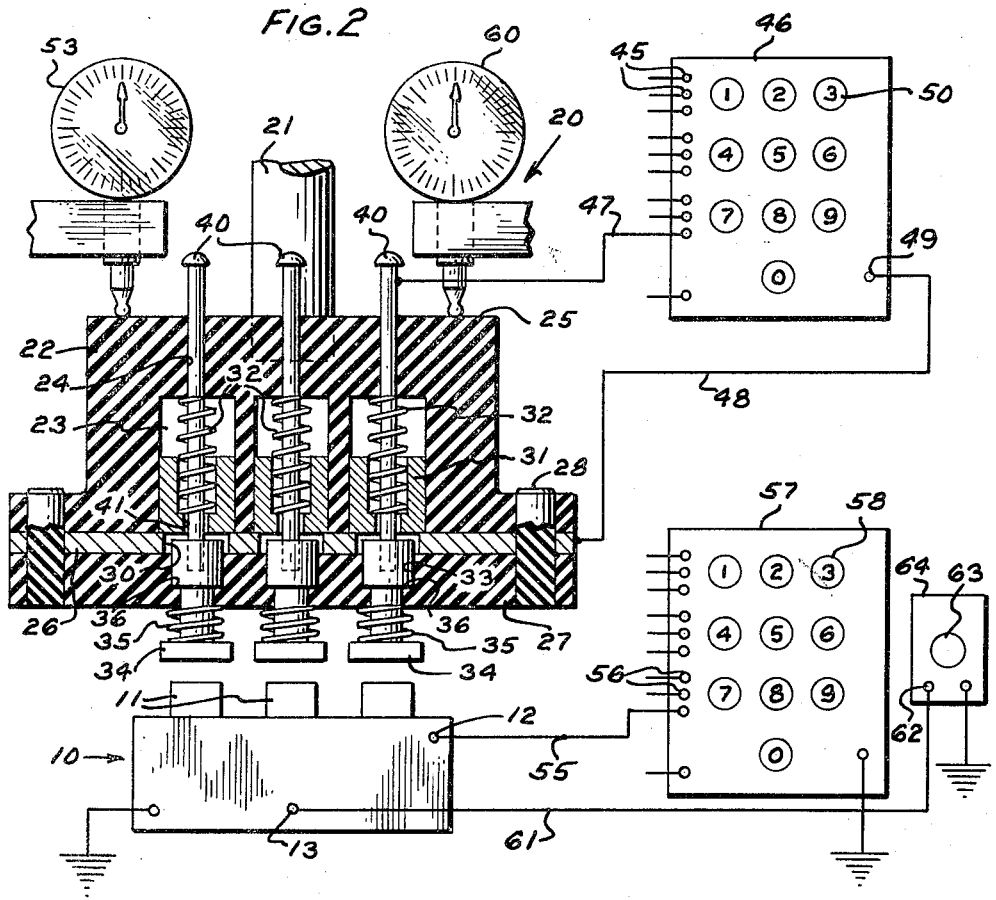
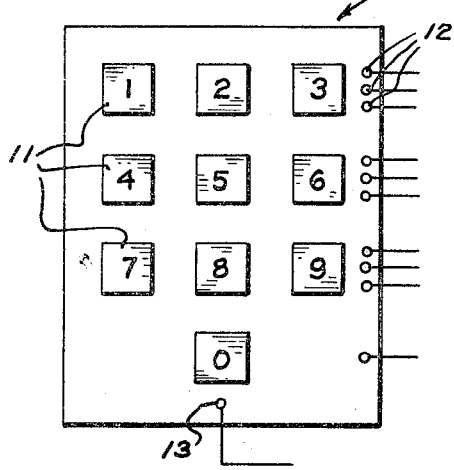
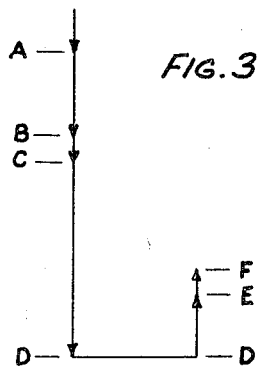
INVENTORS
C. R. BYRD
D. H. WALSTON
BY
ATTORNEY

United States Patent Office 3,183,599
Patented May 18, 1965

3,183,599
APPARATUS FOR TESTING A PLURALITY OF
ASSOCIATED DEVICES
Charles R. Byrd and Dan H. Walston, Indianapolis, Ind., assignors to Western Electric Company, Incorporated, New York, N.Y., a corporation of New York
Filed Dec. 31, 1962, Ser. No. 248,359
8 Claims. (Cl. 33—174)

This invention relates to apparatus for testing a plurality of associated devices, and more particularly to apparatus for testing a plurality of associated devices to determine whether a change in a condition of the devices is accompanied by a corresponding change in a functional characteristic of the devices.

It is an object of this invention to provide improved apparatus for carrying out tests of such a character.

In testing a single device such as a push button switch, it is frequently desired to check various errors against specified manufacturing tolerances. When the single device is assembled into a unit consisting of a plurality of such devices it is desirable to test the devices in unison and yet check each one with respect to the manufacturing tolerances allowable in a single device.

The invention as described herein is applied to the testing of a plurality of push button switches which are incorporated in a common assembly, the push buttons being individually depressible to actuate corresponding switch contacts. In such an application of the invention the various positions of the push buttons along their paths of travel may be considered as a condition of the push button devices, and the open or closed attitude of the associated switch contacts may be considered as functional characteristics of the push button devices. An individual button is considered to have achieved one pertinent condition when it is on the verge of being depressed by the testing apparatus and to have attained another pertinent condition, or its condition has been changed by a prescribed amount, when the push button has been moved a prescribed distance along its path of travel.

The ultimate purpose of the testing apparatus is to determine whether the functional characteristic of the various push button devices, namely, the status of the associated switch contacts, has been changed when the condition of the push button devices, namely, the positions of the associated push buttons, have changed by a prescribed amount.

Simultaneous testing of a plurality of devices incorporated in a common assembly by the apparatus of this invention is effected by establishing a common test limit which is determined by the worst one of the devices. The purpose of one particular test in the illustrated embodiment of the invention is to determine whether each button can travel at least a minimum distance from its normal or raised position without closing the associated switch contacts. In this instance, the worst device with respect to the first common test limit is the one in which movement of the push button is initiated last. In other words, the worst device is the last device to achieve a condition whereby it starts movement from its normal condition. This worst device determines the common testing limit (the point at which its push button commences movement) and thus requires in the other devices that the push buttons travel more than a specified minimum distance without actuating the associated switch contacts. If all the contacts remain open when the push button of the worst device has been moved through the prescribed minimum distance to a second test limit, it is obvious that the other devices pass the test since their push buttons have been moved through at least as great a distance without actuation of their contacts. There are many other testing procedures for which the apparatus may be used, some of which are described below.

A further object of this invention is to provide apparatus for determining whether a preselected change in a condition of a worst one of a plurality of associated devices causes a corresponding change in the functional characteristics of any of the devices.

Another object of this invention is to provide apparatus for determining when a change in a functional characteristic of a worst one of a plurality of associated devices occurs during a change in the conditions of all the devices.

A still further object of this invention is to provide new and novel apparatus for rapidly testing a plurality of associated devices.

In accordance with one embodiment of the invention, a plurality of associated devices are tested by a plurality of members individually responsive to the conditions of the respective devices. The members are first actuated to detect a common test limit which is established by a worst device achieving a particular condition or acquiring a particular functional characteristic. Upon further actuation of the members, all of the devices are tested, either to detect when a worst device changes its functional characteristic while a change is made in the conditions of all the devices, or to determine whether the devices have changed their functional characteristics following a prescribed change in the condition of the worst device.

This invention together with the further objects and advantages thereof will best be understood by reference to the following description taken in conjunction with the accompanying drawings, in which:

FIG. 1 is a front view of a telephone caller or dial unit consisting of a plurality of push button switches;

FIG. 2 is a cross-sectional view of the apparatus comprising one embodiment of the invention; and FIG. 3 is a diagrammatical representation of one manner in which the apparatus is used for testing the unit shown in FIG. 1.

In FIG. 1, the dial unit, generally designated by the numeral 10, has a plurality of individual push buttons 11 which are individually depressed to call a desired telephone station. As the buttons 11 are depressed, particular switches associated with each button 11 are operated. The manner in which the switches are operated by the buttons 11 is not of importance in this application. It suffices to say that a button 11, upon depression, should first close two associated ones of a group of frequency switches, and then open a common switch associated with all of the buttons 11 before completion of travel. Since the manner in which each individual button 11 operates the two associated frequency switches is not pertinent in an explanation of the present invention, the ensuing description treats the switches as though each button 11 operates a single frequency switch plus the common switch during its depression.

In FIG. 1, plurality of terminals 12 are shown, each being a terminal of one frequency switch. A terminal 13 is also provided for the single common switch.

In order that the push button switches may operate the associated frequency switch contacts and the common switch contacts reliably and in the prescribed sequence after a large number of operations, it is desired that each push button initially operate these contacts within prescribed limits of push button travel.

A set of limits for the push button switch is illustrated graphically in FIG. 3. The initial or normal position of the push button is designated by the letter A. At this point the frequency switch contacts are open and the common switch contacts are closed. When the push button is depressed to position B the contacts should remain as at position A. When the button is depressed to position C the frequency switch contacts should be closed. Hence, these contacts should close between the two limits B and C.

The push button is then bottomed, thus establishing a limit position designated D. The common switch contacts should be open at this time, and should remain open until the button rises to position E. Finally, these contacts should reclose as the button rises to position F. Accordingly, the common switch contacts should operate between the two limits E and F.

In FIG. 2, an apparatus designed to test concurrently the actuations of the individual switches of the dial unit 10 is generally designated by the numeral 20. A central shaft 21 mounted for reciprocal movement on a suitable frame (not shown) carries a gaging body 22 constructed of non-conductive material. The gaging body 22 has a series of spaced apart bores 23. Each bore 23 has a coaxial opening 24 of smaller diameter extending from the bore 23 to a top surface 25 of the gaging body 22.

A conducting plate 26 and a non-conducting head plate 27 are secured to the gaging body 22 by suitable pins 28. The conducting plate 26 has openings 30 coaxial with and of a slightly smaller diameter than the bores 23.

Within each bore 23 is a conducting member 31 mounted for reciprocal movement and spring biased by a relatively heavy spring 32 into a normally abutting relationship with the conducting plate 26.

The head plate 27 has a series of counterbored holes 33 coaxial with the bores 23 and of a smaller diameter than the openings 30 in the conducting plate 26. Inside each counterbored hole 33 a foot-like conducting member 34 is spring biased by a light spring 35 into a position abutting a shoulder 36 surrounding the counterbored hole 33. If the test apparatus 20 is mounted for use in the manner shown in FIG. 2, it is not necessary to include the light spring 35, as the force of gravity urges the foot-like member 34 toward the proper position.

A slender conducting rod 40 is secured to the foot-like member 34. The rod 40 passes upwardly through a hole 41 in the conducting member 31, through the open axial portion of the heavy spring 32, and through the small opening 24. The hole 41 in the conducting member 31 has a larger diameter than the diameter of the rod 40 such that no contact is made by members 31 and 40.

When the central shaft 21 of the test apparatus 20 is lowered, each individual foot-like member 34 first contacts its associated button 11. The members 34 will then yield since the strength of the light springs 35 are not sufficient to depress the push buttons. Accordingly, the foot-like members 34 move upward relative to the gaging body 22 until they contact their associated conducting members 31. At this time individual circuits are established from corresponding terminals 45 on a light panel 46, leads 47, the conducting rods 40, the foot-like members 34, the conducting members 31, the conducting plate 26, a common lead 48, a common terminal 49, and corresponding individual light bulbs 50 on the light panel 46. Since individual circuits are established to the light panel 46 each time an individual foot-like member 34 contacts its associated conducting member 31, an indication is obtained on the light panel 46 of the order in which the respective foot-like members engage their associated conducting members.

As the gaging body 22 is moved further downward, the strength of the heavy springs 32 is sufficient to depress the buttons 11. Accordingly, the preceding energization of a light 50 is an indication that the corresponding button 11 is about to commence travel, the slack between the corresponding members 31 and 34 having been taken up. Further, the order in which the foot-like members engage their associated conducting members is an indication also of the order in which the push buttons are depressed by the apparatus of this invention. Presumably, all ten of the lamps 50 become energized as the gaging body 22 is moved downward over a small portion of its travel.

Further downward movement of the gaging head causes closing of the various frequency switch contacts, the amount of movement being shown on a dial indicator 53. With the closing the frequency switch contacts individual circuits are established from the terminals 12 through corresponding leads 55 and terminals 56 on a light panel 57 and a corresponding lamp 58. Correspondingly, the order of operation of the lights on panel 57 is an indication of the order of operation of the associated frequency switches.

When the gaging head bottoms, the lamps 50 are extinguished by separation of the conducting members 31 from the conducting plate 26, the springs 32 yielding as the push buttons bottom. The order in which the lamps 50 are extinguished is therefore an indication of the order in which the respective push buttons are bottomed.

The gaging head may then be raised until the common switch contacts close, the amount of movement being shown on a second dial indicator 60. When the common switch contacts close, a circuit is completed from the terminal 13 through a lead 61 and a terminal 62 to a lamp 63 or a panel 64.

*Methods of using the testing apparatus*

Due to normal deviations in the construction of the individual push buttons 11 and of the completed assembly 10, the buttons 11 have random heights. The testing apparatus comprising the present invention permit concurrent and joint testing of the push button switches in spite of this through the establishment of a common test limit for all switches which is based on the worst switch.

In the preferred test procedure the gaging head is lowered from its raised position and a first common test limit is established when the last light 50 comes on. Therefore, the order of operation, for the depression of the push buttons, of interest in this particular test is one wherein an indication is had that the last of the buttons is being depressed by the apparatus. The lighting of the last light 50 indicates that the last or shortest button 11 has been engaged for travel, and also indicates which particular button 11 was the last to be engaged. The last button to be so engaged is the worst with respect to this common test limit and the condition of that particular button, that is its position, is made the reference condition for the first test. This common test limit is indicated at point A in FIG. 3, and is recorded by setting of the dial indicator 53 to ZERO or by noting the reading.

The gaging body 22 is then moved downward until the indicator 53 indicates that a distance of 35 mils has been traveled. This point is indicated by B in FIG. 3. None of the buttons 11 should operate their associated frequency switches when the point B is reached. During this prescribed movement the condition (position) of the worst button with respect to the first test limit has been changed by 35 mils.

If during this prescribed travel from point A to point B, any of the buttons do change the functional characteristics of their associated frequency switches, that is a button closes its associated frequency contacts, an individual circuit will be completed to energize the associated light 58. If all of the lights 58 are unlit then all of the buttons 11 pass the test for all the buttons have been depressed by at least the minimum allowable amount without actuation of the associated frequency switches. If any frequency switches are actuated during this portion of the travel of gaging body 22, the operator may, if desired, adjust them so that the unit will pass this test.

After making any necessary corrections to the dial unit 10, the operator advances the gaging body 22 another 10 mils as indicated on dial indicator 53. During this portion of the travel from point B of FIG. 3 to point C, all the buttons 11 should close their associated frequency switches. The changing of the functional characteristics of the frequency switches is indicated on the light panel 57 in the aforedescribed manner.

The operator, when point C is reached, checks light panel 57 to determine whether all the frequency switches have been operated. If all the lights 58 are lit then all the buttons 11 pass the test for all the associated frequency switches have been actuated. Any unlit light bulbs 58 indicate frequency switches which failed to close and the operator can make the necessary corrections to those particular buttons so that their associated frequency switches are closed.

After this testing of the frequency switches, the buttons are further depressed to establish another common limit. This second common test limit is established by a first one of the buttons 11 reaching the end of its travel and is indicated in FIG. 3 as point D. Therefore, the order of operation, for the bottoming of the push buttons, of interest in this particular test is one wherein an indication is had that the first of the buttons has reached the end of its travel. When the first of the buttons 11 reaches this point it can no longer be depressed. A further slight advance of the gaging body 22 causes the associated heavy spring 32 to yield and breaks the circuit of the corresponding light bulb 50. Thus, the worst push button with respect to this testing limit is indicated when the first light 50 on light panel 46 is extinguished.

The operator now reads the dial indicator 53 to determine whether at least a specified minimum displacement has taken place from point A to point D. This change in the condition of the buttons is measured from the first common test limit to the second common test limit. Accordingly, it is measured from the point of initial movement of the worst button (the last to start movement) to the point of bottoming the worst button (the first to bottom, which button may be a different button or the same button). If this test is passed, all buttons are known to be capable of at least the prescribed minimum travel.

If this test is passed the operator sets the dial indicator 60 to zero or notes the reading, and moves the gaging body 22 upwardly until the indicator 60 records a displacement of 25 mils. This establishes point E of FIG. 3. At this point the common switch associated with all the buttons 11 should be open. If the common switch has closed the light bulb 63 on the light panel 64 will be lit and the operator may make the necessary corrections.

The gaging body is again moved upwardly 10 mils to point F by noting the displacement recorded on dial indicator 60. At this point the common switch should be closed and the indicator light 63 should be lit. If the common switch does not have the proper functional characteristic at this point the operator may make the necessary correction.

The circuits involved in this disclosure may be easily modified so that the lights on the various light panels will work in a reverse manner when a particular operation takes place.

Dial indicator 53 is used when the test apparatus 20 is being moved downward as it gives a positive indication of the distance traveled in a downward direction. Dial indicator 60 is used when the test apparatus 20 is being moved upward as it gives a positive indication of the distance traveled in an upward direction. Only one indicator is necessary but the use of two indicators avoids unnecessary calculating.

The test procedure as described may be repeated several times to insure that any corrective action taken by the operator has not put the devices out of tolerance with respect to other operative conditions of the unit.

The testing procedure as described above may be carried out in several manners and different tests may be run on the unit 10. One example of a testing procedure utilizing different procedures and different tests is as follows.

Point A is established in the aforedescribed manner, that is point A is determined when the last push button 11 is engaged for travel. At this point the operator sets dial indicator 53 to zero, and then moves the gaging body 22 downward until the first light 58 on light panel 57 comes on. This indicates that one of the buttons has changed its condition sufficiently to change the functional characteristics of its associated frequency switch. The particular one of the buttons 11 which first actuates its associated frequency switch is the worst device with respect to this testing limit since at least a prescribed minimum amount of travel is required. This worst device may be any one of the devices and its identity is established by the lighting of its corresponding light 58.

The dial indicator gage 53 is again read to determine whether the necessary 35 mils have been traveled before operation of a frequency switch. If the necessary distance has not been traveled, the operator adjusts the particular frequency switch and advances the gaging body 22 until he again gets an indication that a worst device has closed its associated frequency switch, thereby re-establishing a second test limit for the unit. If dial indicator gage 53 shows that at least 35 mils have been traveled then the operator knows that all the devices have passed the test for all of the buttons have then changed conditions by at least the prescribed minimum distance without any frequency switches being actuated.

The operator again zeros indicator 53 and advances the gaging body 22 until all the lights 58 on light panel 57 are lit. When the last light 58 comes on the worst device with respect to this test limit is established, as it changes the functional characteristics of the last associated switch and establishes a third test limit. The reading on indicator 53 shows the change in the condition of the worst device with respect to the second test limit prior to change in the functional characteristic of the worst device with respect to the third test limit.

If the reading on the indicator 53 does not fall within the prescribed design limits then the unit 10 is adjusted and the third test limit re-established, and the testing procedures repeated.

Another alternate test may require that each push button 11 actuate the associated switch contact by the time a worst one of the buttons has traveled a prescribed maximum distance. In other words, each button is required to change a functional characteristic of its associated switch contacts during a period when at least one of the buttons condition has been changed by a maximum allowable amount. In this instance, the worst device is the one in which movement of the push button is initiated first. This worst device, which determines a common testing limit, is detected when a first button 11 is engaged for movement and causes lighting of its corresponding light 50 on light panel 46. Establishment of the worst device as the first device whose associated push button commences movement thus requires in the other devices that the push button actuate the associated switch contacts prior to traveling the prescribed maximum allowable amount.

Gaging body 22 may then be lowered to depress all of the buttons 11 until all the individual lights 58 of light panel 57 are lit. Dial indicator 53, which was zeroed when the worst device established the common test limit, will now indicate the necessary change in the condition of the push buttons before actuation of their associated frequency switches. If all of the devices have actuated their associated frequency switches for the dial indicator 53 indicates the prescribed maximum travel, it is known that all of the devices pass the test.

The apparatus provided by this invention for testing a plurality of associated devices such as push buttons allows for a rapid testing of these devices. There is no need of a previous determination of which of the devices is the worst with respect to the various testing limits since the testing apparatus automatically indicates the worst device with respect to each limit.

The testing apparatus of this invention also permits the operator to carry out testing procedures in several different manners. The operator may make a preselected change in the condition of at least one of the devices from a first common testing limit and then determine whether any of the devices have had a corresponding change in their functional characteristics, or he may actuate the devices until the corresponding changes occurs in the functional characteristics of a worst one of the devices and then determine whether the change in conditions of the devices falls within a preselected testing limit.

While only one embodiment of the invention has been disclosed, many modifications will be apparent and it is intended that the invention be interpreted as including all modifications which fall within the true spirit and scope of this invention.

What is claimed is:

1. Apparatus for simultaneously testing a unit consisting of a plurality of associated push button switches projecting to random heights above a surface of the unit to determine the order in which the buttons are depressed toward the surface of the unit which comprises:
   a gaging head movable relatively toward and away from the push buttons;
   a plurality of members individually mounted within said gaging head, each of said members being arranged for concurrent engagement with a corresponding one of the push buttons as said gaging head is moved toward push buttons, and each of said members being yieldable for dispacement with respect to said gaging head in response to the pressure of the engaged push button thereagainst;
   means mounted within said gaging head in a normal spaced apart relationship with respect to each of said members for individually engaging the associated member to terminate the displacement of said member with respect to said gaging head such that further movement of said gaging head toward the push buttons causes depression of the push button associated with said individual member; and
   means responsive to the individual engagement of said members with said engaging means for indicating the order in which the respective push buttons are depressed by said associated members.

2. Apparatus for simultaneously testing a unit consisting of a plurality of associated push button switches projecting to random heights above a surface of the unit to determine the order in which the buttons reach the end of their travel and are bottomed as they move toward the surface of the unit which comprises:
   a gaging head movable relatively toward and away from the push buttons;
   a plurality of members individually mounted within said gaging head and movable therewith and relative thereto so that as said gaging head moves toward the push buttons individual of said members individually engage and depress the push buttons in an order controlled by the height to which individual of the buttons project above the surface of the unit;
   means associated with individual of said members for releasably holding said members during movement of said members toward the push buttons such that an individual member engaging a push button causes depression thereof;
   means responsive to the bottoming of individual of the push buttons to release individual of the releasable holding means associated with the member engaging the bottomed push button; and
   means responsive to the individual releasing of said releasable holding means to indicate the order in which the push buttons reach the end of their travel and are bottomed as they move toward the surface of the unit.

3. Apparatus for simultaneously testing a unit consisting of a plurality of associated push button switches projecting to random heights above a surface of the unit and having individual switch contacts to determine the relationship between the order of depression of the buttons and the order of operation of the associated switch contacts, said apparatus comprising:
   a gaging head movable relatively toward and away from said push buttons;
   individual means mounted on said gaging head and movable therewith and relatively thereto so that as said gaging head moves toward the push buttons said individual means individually engage and depress the push buttons in an order controlled by the height to which individual of the buttons project above the surface of the unit;
   means responsive to the engagement and depression of individual buttons by said individual means for indicating the order in which respective push buttons are depressed, a first testing position for said gaging head being established when depression of a selected one in the order of buttons is indicated;
   means for moving said gaging head a preselected distance beyond the first testing position to establish a second testing position; and
   means for indicating whether the switch contacts associated with respective push buttons are open or closed when said gaging head is at its second testing position.

4. Apparatus for simultaneously testing a unit consisting of a plurality of associated push button switches projecting to random heights above a surface of the unit and having individual switch contacts to determine the relationship between the order of depression of the buttons and the order of operation of the associated switch contacts, said apparatus comprising:
   a gaging head movable relatively toward and away from said push buttons;
   individual means mounted on said gaging head and movable therewith and relatively thereto so that as said gaging head moves toward the push buttons said individual means individually engage and depress the push buttons in an order controlled by the height to which individual of the buttons project above the surface of the unit;
   means responsive to the engagement and depression of individual buttons by said individual means for indicating the order in which respective push buttons are depressed, a first testing position for said gaging head being established when depression of a selected one in the order of buttons is indicated;
   means for indicating the order in which the push buttons open or close their associated switch contacts upon further depression of the push buttons beyond the first testing position, a second testing position being established when a selected one of the buttons opens or closes its associated switch contacts; and
   means for indicating the incremental change in position of said gaging head between the first and second testing positions.

5. Apparatus for simultaneously testing a unit consisting of a plurality of associated push button switches comprising:
   a gaging head movable relatively toward and away from the push buttons;
   a plurality of members individually mounted within said gaging head, each of said members being arranged for concurrent engagement with a corresponding one of the push buttons as said gaging head is moved toward the push buttons, and each of said members being yieldable for displacement with respect to said gaging head in response to the pressure of the engaged push button thereagainst;
   means mounted within said gaging head in a normal, spaced apart relationship with respect to each of said members for individually engaging the associated member to terminate the displacement of said member with respect to said gaging head such that further movement of said gaging head toward the push buttons causes depression of the push button associated with said individual member;

means responsive to the individual engagement of said members with said engaging means for indicating the order in which the respective push buttons are depressed by said associated members;

means mounted within said gaging head and cooperable with individual of said engaging means for permitting said engaging means and member associated therewith to yield in response to a bottoming of the push button by said member associated therewith; and means responsive to the individual yielding with respect to said gaging head of said engaging means and member associated therewith for indicating the order in which the respective push buttons are bottomed.

6. Apparatus for simultaneously testing a plurality of associated push button switches comprising:

a gaging head movable relatively toward and away from the push buttons;

a plurality of members individually mounted within said gaging head, each of said members being arranged for concurrent engagement with a corresponding one of the push buttons as said gaging head is moved toward the push buttons, and each of said members being yieldable for displacement with respect to said gaging head in response to the pressure of the engaged push button thereagainst;

means mounted within said gaging head in a normal, spaced apart relationship with respect to each of said members for individually engaging the associated member to terminate the displacement of said member with respect to said gaging head such that further movement of said gaging head toward the push buttons causes depression of the push button associated with said individual member;

means responsive to the individual engagement of said members with said engaging means for indicating the order in which the respective push buttons are depressed by said associated members, a first testing position for said gaging head being established when depression of a selected one in the order of buttons is indicated;

means mounted within said gaging head and cooperable with individual of said engaging means for permitting said engaging means and members associated therewith to yield in response to a bottoming of the push button by said member associated therewith;

means responsive to the individual yielding with respect to said gaging head of said engaging means and member associated therewith for indicating the order in which the respective push buttons are bottomed, a second testing position for said gaging head being established when bottoming of a selected one in the order of buttons is indicated; and means for indicating the incremental change in position of said gaging head between the first and second testing positions.

7. Apparatus for simultaneously testing a unit consisting of a plurality of associated push button switches having contacts associated therewith comprising:

a gaging head movable relatively toward and away from the push buttons;

a plurality of members individually mounted within said gaging head, each of said members being arranged for concurrent engagement with a corresponding one of the push buttons as said gaging head is moved toward the push buttons, and each of said members being yieldable for displacement with respect to said gaging head in response to the pressure of the engaged push button thereagainst;

means mounted within said gaging head in a normal, spaced apart relationship with respect to each of said members for individually engaging the associated member to terminate the displacement of said member with respect to said gaging head such that further movement of said gaging head toward the push buttons causes depression of the push button associated with said individual member;

means responsive to the individual engagement of said members with said engaging means for indicating the order in which the respective push buttons are depressed by said associated members, a first testing position for said gaging head being established when depression of a selected one in the order of buttons is indicated;

means for moving said gaging head a preselected distance beyond the first testing position to establish a second testing position; and means for indicating whether the switch contacts associated with respective push buttons are open or closed when said gaging head is at its second testing position.

8. Apparatus for simultaneously testing a plurality of associated push button switches having contacts associated therewith comprising:

a gaging head movable relatively toward and away from the push buttons;

a plurality of members individually mounted within said gaging head, each of said members being arranged for concurrent engagement with a corresponding one of the push buttons as said gaging head is moved toward the push buttons, and each of said members being yieldable for displacement with respect to said gaging head in response to the pressure of the engaged push button thereagainst;

means mounted within said gaging head in a normal, spaced apart relationship with respect to each of said members for individually engaging the associated member to terminate the displacement of said member with respect to said gaging head such that further movement of said gaging head toward the push buttons causes depression of the push button associated with said individual member;

means responsive to the individual engagement of said members with said engaging means for indicating the order in which the respective push buttons are depressed by said associated members, a first testing position for said gaging head being established when depression of a selected one in the order of buttons is indicated;

means for indicating the order in which the push buttons open or close their associated switch contacts upon further depression of the push buttons beyond the first testing position, a second testing position for said gaging head being established when a selected one of the buttons in the order opens or closes its associated switch contacts; and means for indicating the incremental change in position of said gaging head between the first and second testing positions.

References Cited by the Examiner
UNITED STATES PATENTS

| | | | |
|---|---|---|---|
| 2,467,539 | 4/49 | Smith | 73—161 |
| 2,534,123 | 12/50 | Hasselhorn. | |
| 2,717,449 | 9/55 | Graham | 33—147 |
| 2,932,900 | 4/60 | Hanlon | 33—174 |

ISAAC LISANN, *Primary Examiner.*